Patented Oct. 13, 1936

2,057,044

UNITED STATES PATENT OFFICE 2,057,044

INSECTICIDE AND PARASITICIDE

Kurt Meisenburg, Leverkusen-I. G. Werk, and Hans Kükenthal, Cologne-Flittard, Germany, assignors to Winthrop Chemical Company, Inc., New York, N. Y., a corporation of New York No Drawing. Application April 22, 1935, Serial No. 17,736. In Germany April 28, 1934

2 Claims. (Cl. 167—22)

This invention relates to insecticides and parasiticides containing as an active ingredient an unsaturated halogenated vaporizable organic compound of at least three carbon atoms.

In accordance with the present invention it has been found that insects and parasites may effectively be combated when using unsaturated halogenated vaporizable organic compounds of at least three carbon atoms. As compounds of this kind especially those containing from three to six carbon atoms, preferably chlorinated butenes have proved suitable. The said compounds should advantageously be applied in the gasified state. Gasification may for instance be effected by passing a current of air or another inert gas, for instance, nitrogen or carbon dioxide and/or another gas suitable for combating insects, such as carbon monoxide, ethylene oxide, hydrocyanic acid etc. through a vessel containing the said unsaturated halogenated hydrocarbons. The said compounds, particularly those of a comparatively high boiling point may also be fumigated with the aid of a nozzle, whereby fumigation is effected by means of compressed gases, such as air, carbon dioxide, nitrogen, etc. The above mentioned compounds which are in general liquids may also be absorbed by porous materials, for instance, kieselguhr, active carbon, porous porcelain, paper, and so on. In this form they are brought into the room to be disinfected where they evaporate, thus effecting the extermination of the insects or parasites.

The said compounds, on application, may be mixed with other liquid or gaseous inert diluents, for instance, water, benzine, acetone, air, nitrogen, carbon dioxide, and/or other liquid or gaseous insecticidal preparations, for instance, vaporizable nitriles, amino nitriles, carboxylic esters of unsaturated cyanhydrins, carbon tetrachloride, etc. Also irritating substances, for instance, chloroformic acid esters, bromoacetophenone, cyanogen chloride, cyanogen bromide, trichloro nitro methane, and the like may be added to exert a warning effect on human beings.

The present invention provides for means by which insects and parasites are immediately killed. The above specified compounds have proved particularly suitable for killing moths of all kinds, storage insects, for instance, mealworms, (Tenebrio molitor), grain weevil (Calandra granaria), Anthrenus fasciatus, bugs, cockroaches, wood-worms, bed bugs (Cimex lectularius), ants and the like. They are more efficacious than the saturated halogenated hydrocarbons and the chlorinated ethylenes. For instance, the allyl chloride to be used according to the present invention is about 10 times as poisonous to the insects as vinyl chloride. The compounds according to the present invention further display the particular advantage of not being inflammable and of not forming explosive mixtures with air. They are therefore advantageously differentiated from certain other insecticides such as for instance carbon disulphide, ethylacetate. Compared with hydrocyanic acid often employed as gaseous insecticide they are less toxic for warm-blooded beings, and therefore poisonings of the persons handling the insecticides are avoided.

The invention is further illustrated by the following examples without being restricted thereto:

*Example 1*

2.4-dichloro-butene-(2) (obtainable by the combination of 2 molecular proportions by hydrogen chloride with 1 molecular proportion of vinylacetylene) is volatilized in a closed chamber until a concentration of 4 grams per cubic meter of air is attained. Moth worms (Tineola biselliella) and moths die within 24 hours.

*Example 2*

Air is passed through a vessel containing 2.4-dichloro-butene-(2) and the mixture is circulated through a silo containing wheat until 10 grams of the said butene per cubic meter have been introduced. After a circulation of 24 hours all grain weevils (Calandra granaria) in the grain are killed.

*Example 3*

1.4-dichloro-butene-(2) (obtainable by the addition of one molecular proportion of chlorine to one molecular proportion of butadiene) is volatilized in a tightly closed box in a quantity of 4 grams per cubic meter of air. The objects present in the box, as for example collections of dried plants or of insects are thus unobjectionably freed from pests or killed respectively; in particular all larvae of wool bear (buffalo moth, Anthrenus fasciatus) are killed. Similar results are obtained when the said dichlorobutene is replaced by: 1.2-dichloro-butene-(3), 1.4-dichloro-2-methylbutene-(2), 5-chloropentene, 1.1-dichloro-butene-(2), 1-iodo-butene-(2), 1-chloro-2-methyl-propene-(1), 2-chloro-2-methyl-propene-(1), 1-bromo-2-methyl-propene-(1), chlorotrimethyl-ethylene, 2-chloro-2-methyl-butene-(3), 4-bromo-2-methyl-butene-(3), 4-chloro-2-methyl-pentene-(4), chloro substituted 2-methyl-pentadiene-(2.x), iodo-isopropylacetylene.

Example 4

In a tightly closed gasification box containing drugs attacked by *Tenebrio molitor* and *Calandra granaria*, allylchloride in a concentration of 50 grams per cubic meter of air is gasified. After 24 hours all insects are killed.

The same result is obtained when gasifying crotyl bromide in a concentration of 12 grams per cubic meter of air.

Also dimethyl-allylbromide and allylfluoride may be used for the same purpose.

We claim:—

1. An insecticide and parasiticide comprising as an active ingredient a dihalogenated butene.
2. An insecticide and parasiticide comprising as an active ingredient a dichlorinated butene.

KURT MEISENBURG.
HANS KÜKENTHAL.